Patented Aug. 9, 1938

2,126,089

UNITED STATES PATENT OFFICE 2,126,089

INTERNAL COMBUSTION ENGINE

Charles S. Brown, Syracuse, N. Y.

Application January 9, 1936, Serial No. 58,347

1 Claim. (Cl. 123—173)

This invention relates to internal combustion engines and particularly to a cylinder or cylinder barrel construction in which a liner is used, and a body of metal, as aluminum alloy, having greater heat conductivity than that of the liner and with the portion of the liner located below the compression chamber of the cylinder barrel or liner naked and exposed to a cooling medium.

It further has for its object a cylinder barrel construction in which the body of metal having greater heat conductivity is formed with a jacket for cooling medium in which the portion of the liner below the compression chamber is naked and exposed in the jacket, all for the purpose of quickly and uniformly cooling the cylinder barrel.

The invention consists in the novel features and in the combinations and constructions hereinafter set forth and claimed.

In describing this invention, reference is had to the accompanying drawings in which like characters designate corresponding parts in all the views.

Figure 1:
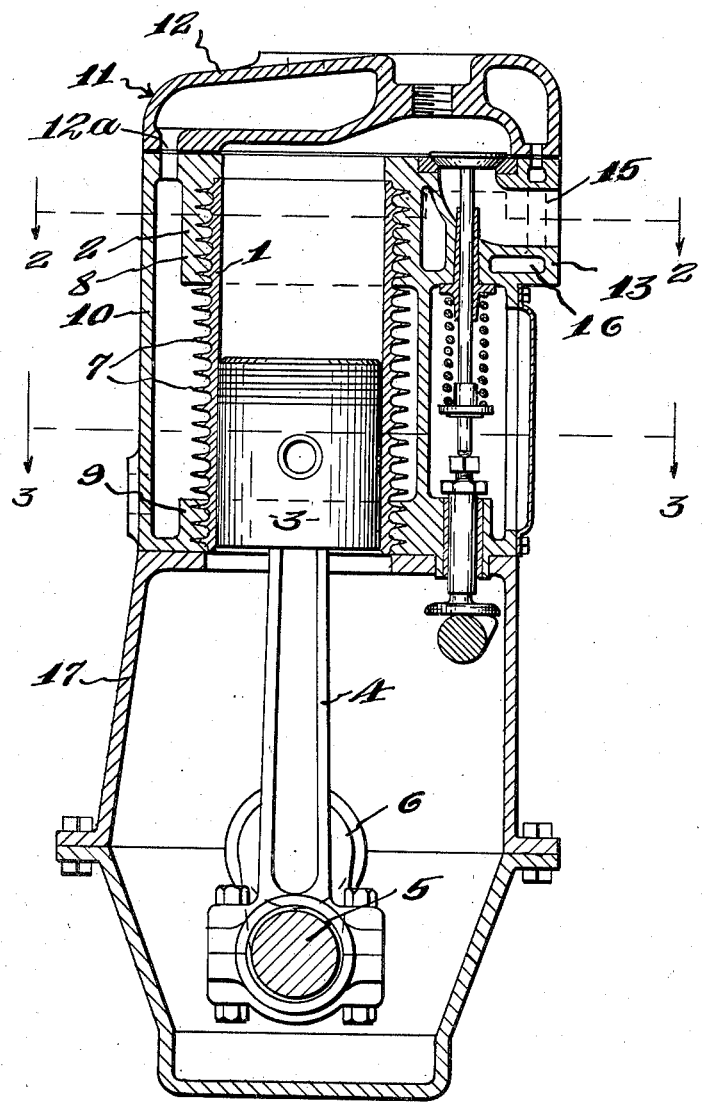

Figure 1 is a vertical sectional view of an engine having a cylinder block built in accordance with this invention.

Figure 2:
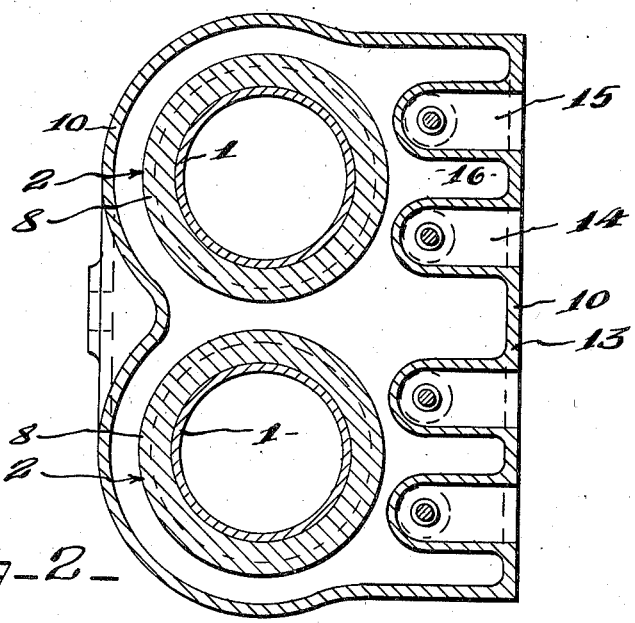
Figure 3:
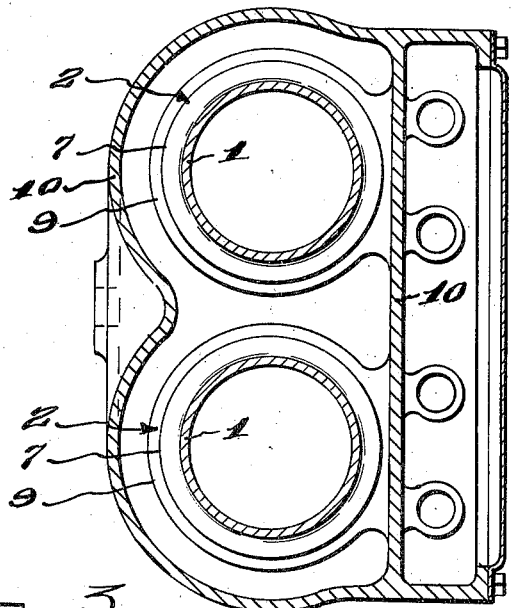

Figures 2 and 3 are respectively sectional views taken on lines 2—2 and 3—3, Figure 1.

Figure 4:
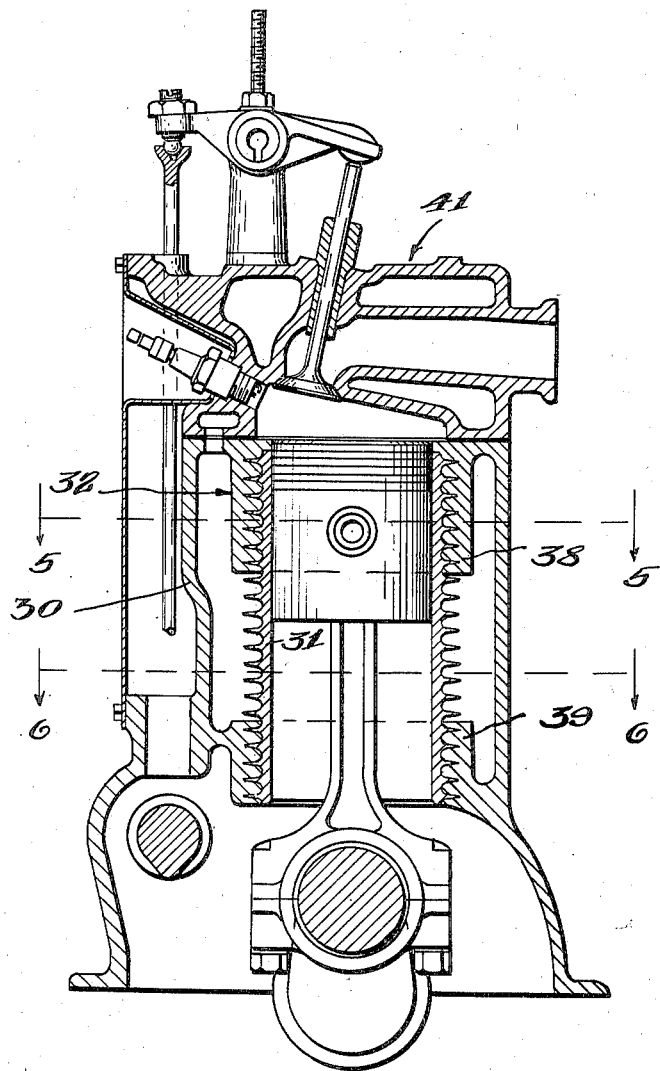

Figure 4 is a view similar to Figure 1 of an engine embodying my invention with the valves in the head.

1 designates the liner of the cylinder barrel and 2 a body of a metal, as aluminum alloy, having higher heat conductivity than that of the liner which is usually a ferrous metal.

3 designates the piston movable in the liner and connected by a connecting rod 4 with the crank 5 of the crank shaft 6. The liner 1 is formed with fins or flanges 7 on the periphery thereof, these flanges being shown as extending circumferentially. They are thin, knifeblade flanges having a certain amount of flexibility, the flexibility being for the purpose of compensating for differential expansion and contraction of the aluminum alloy body and the flanges and the liner and its flanges embedded in the body. The body 2 is formed with collars 8, 9 surrounding the opposite end portions of the liner 1 and in which collars the flanges on said end portions are embedded to which they are integrally united by the casting of the collars 8, 9 around the opposite end portions of the liner. The intermediate portion of the liner and the flanges thereon between the collars 8, 9 are naked and exposed to any cooling medium that may be used.

In the engine here shown, the body is also constructed to form a jacket 10 for a cooling medium, this jacket extending the full length of the liner and the intermediate portion of the liner between the collars 8, 9 is exposed in the jacket throughout its circumference.

The cooling medium used is preferably a liquid cooling medium or a cooling medium with a high boiling point and extremely low freezing point. One of the mediums used may be lubricating oil used in the lubricating system of the engine.

11 is the head of the cylinder, this being formed with a jacket 12 which communicates through passages 12ª with the jacket 10. The cooling medium is circulated in any suitable manner.

The engine shown in Figure 1 is of the L-head type and the collar 8 is formed with an offset 13 for each cylinder in which the intake and exhaust ports 14, 15 are formed, and these offsets 13 are formed with passages 16 around the ports, the passages forming continuations of the jacket 10. The collar 8 is located to strengthen the compression chamber portion of the barrel, and of sufficient length to efficiently transmit excess heat from the liner 1 surrounding the combustion chamber to the outside jacket wall 10 so that portion 10 will have a greater cooling effect on the liner 1 than it would otherwise have. Also, the lower collar 9 has a somewhat similar effect.

In the construction here shown, the cylinder block is formed separately from the crank casing 17 but may be formed integral therewith, as shown in Figure 4.

Owing to the intermediate naked portions of the liners, cylinder elongation and contraction under the influence of varying engine temperature take place with minimum strain between the liners and the body or jacket of aluminum alloy.

In Figure 4, a valve-in-the-head motor is shown and the liner 31 and body 32 are substantially the same construction as in Figure 1, except that the collar 38 is not formed with an offset for intake and exhaust ports, as the intake and exhaust ports are formed in the head 41. The valves therein are operated by over-head valve mechanism. Thus, the jacket 30 in Figure 4 takes the form of a trough in a box common to a plurality of liners and has collars 38, 39 surrounding the ends of the liners 31, the intermediate portions of the liners being exposed to the cooling medium in the box or jacket 30.

By this cylinder barrel construction, the cylinder or the liner thereof is strongly supported and because the portion thereof is naked and exposed to the cooling medium and also because the liner is embedded at both ends particularly for some length on the combustion space end in the same high specific heat transmitting alloy as the jacket, the liner or the entire cylinder block is uniformly and quickly cooled with a relatively thick cooling medium, as oil, or other special preparation having a high boiling point and low freezing point.

What I claim is:—

A cylinder barrel construction for internal combustion engines comprising a liner and an outer body of metal having greater heat conductivity than the liner, the liner having fins on the periphery thereof and the outer body having collars surrounding opposite end portions of the liner in which collars the adjacent flanges of the liner are embedded and to which collars the end portions of the cylinder are integrally united, the outer body forming a jacket and the intermediate portion of the liner and the fins thereon between the collars being exposed in the jacket, and a detachable cylinder head mounted on the outer end of the body.

CHARLES S. BROWN.